Nov. 18, 1924.
C. E. SWENSON
UNIVERSAL JOINT
Filed Aug. 9, 1922
1,516,251
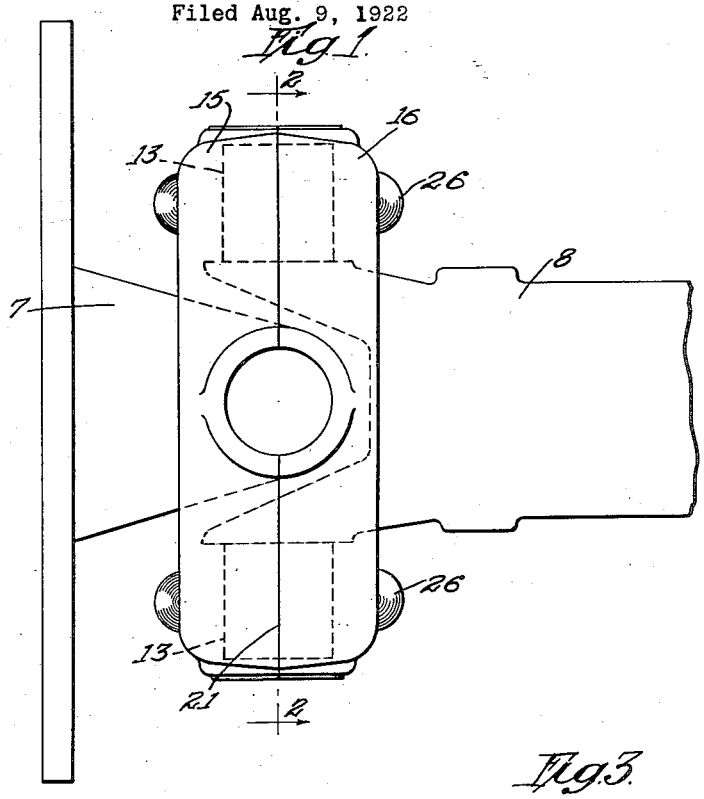
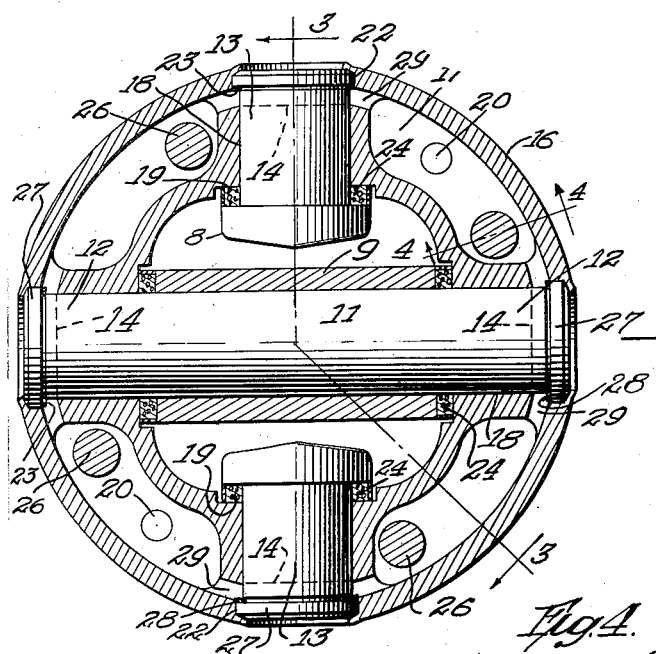
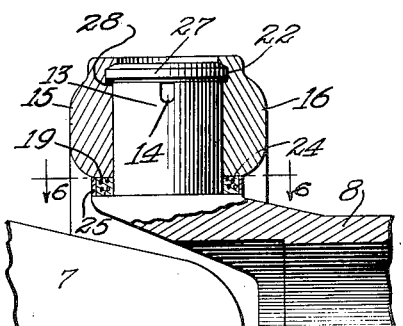
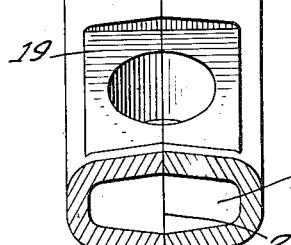
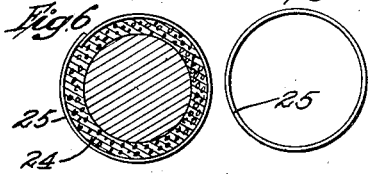
Inventor
Carl E. Swenson
By Wilson & McCanna Attys.

Patented Nov. 18, 1924.

1,516,251

UNITED STATES PATENT OFFICE.

CARL E. SWENSON, OF ROCKFORD, ILLINOIS, ASSIGNOR OF ONE-FOURTH TO LEVIN FAUST, ONE-FOURTH TO ERIC S. EKSTROM, AND ONE-FOURTH TO CARL L. ANDERSON, ALL OF ROCKFORD, ILLINOIS.

UNIVERSAL JOINT.

Application filed August 9, 1922. Serial No. 580,606.

*To all whom it may concern:*

Be it known that I, CARL E. SWENSON, a citizen of the United States, residing at Rockford, in the county of Winnebago and State of Illinois, have invented certain new and useful Improvements in Universal Joints, of which the following is a specification.

This invention pertaining to universal joints, is an improvement of that class of joint disclosed in Patent No. 1,205,610, Nov. 21, 1916, and embodies certain characteristics claimed therein with respect to the trunnion bearings. That is, my present invention includes trunnion-type coupling members, the trunnions of which fit in bearings in a transmission or connecting ring and are lubricated by suitable means. It also embraces the provision of end thrust bearings for the outer ends of the trunnions and suitable packing washers for the inner ends thereof as claimed in said patent.

One of the objects of the present invention is to provide a universal joint embodying the characteristics named, and designed in such simple and novel manner as to be exceptionally durable, well lubricated, and especially suited to the requirements of motor vehicle service.

My invention further contemplates certain novel features of design and construction, explained more fully hereinafter, which tend toward economy in the manufacture and assembly of a universal joint and enable the production of what might be termed a low-price joint, which however, embodies certain salient features found to be very desirable in practical operation of devices of this kind.

Other objects and attendant advantages will be appreciated by those skilled in the art as the invention becomes better understood by reference to the following description when considered in connection with the accompanying drawing, in which—

Figure 1 is a side view of a universal joint embodying my invention;

Fig. 2 is a sectional view through the joint taken substantially on the line 2—2 of Fig. 1;

Fig. 3 is a sectional view taken substantially on the line 3—3 of Fig. 2;

Fig. 4 is a section taken on the line 4—4 of Fig. 2; and

Figs. 5 and 6 are sections taken on the line 6—6 of Fig. 3 showing several modifications of a packing retaining band.

My invention contemplates the use of trunnion-type coupling members of any suitable construction. In the present instance, I have shown coupling members designated generally by 7 and 8, the former of which has an end 9 bored for the reception of a rod 11, the ends 12 of which provide trunnions, and the latter of which is in the form of a forging having trunnion ends 13 turned to shape. It should be understood, however, that both coupling members may be similar in construction to the member 8 as is common practice in this art. The outer end of each trunnion is finished for contact against an end thrust bearing surface and is slotted diametrically at 14 for the passage of lubricant, as will be explained more fully hereinafter.

The transmission member or connecting ring is preferably of sectional construction comprising two half sections 15 and 16 in the form of housings, either forged or cast to shape and jointly providing a lubricant reservoir 17 and bearings 18 for the trunnions.

In the manufacture of the transmission member, the first operation after the sections have been formed is to broach or otherwise machine the packing seats 19. Each section of the transmission member will then be ground or otherwise finished on its face 21 to provide a tight joint when both sections are clamped together, and said sections will be drilled for the reception of fastening means, such as bolts, rivets, or the like for clamping and securing said sections together. The sections will, however, be temporarily bolted together at this stage in the manufacture to permit of accurately boring and reaming the trunnion bearings 18 and for counter-boring the outer ends of said bearings at 22 for the reception of end thrust bearing members which will be presently described. Each counter-bore 22 is of somewhat larger diameter than the bore of the bearing 18, thereby providing a shoulder 23 at the inner end of the counter-bore.

After the foregoing operations the fastening means will be removed to permit assembly of the coupling or trunnion members in connection with the transmission member. Before assembly, however, an annular packing 24 will be positioned on the inner end of each trunnion. This packing may be of any suitable material or composition, but is preferably of cork. A metallic retaining band 25 embraces the packing and may either be in the form of a solid band as shown in Fig. 5, or a split band as shown in Fig. 6. In the latter instance, the ends are overlapped and the band is contracted on the packing so as to compressingly but yieldingly retain the packing. The trunnion members will then be positioned between the sections 15 and 16 and the latter will be bolted or otherwise rigidly secured together. In the present instance, rivets 26 are employed for this purpose. It will be evident that by riveting the sections together, a substantially integral transmission structure is provided, the intention being that the universal joint throughout will be constructed in such manner as to be serviceable without repair, for the life of the motor vehicle to which it is applied. In other words, a lubricating universal joint is provided which is so constructed that it should not require attention except for replenishing the oil or lubricant supply, which may be done through one of the plugged openings 20, the other of which serves as a vent.

After the foregoing assembly, a hardened steel bearing member or disk 27 will be inserted in each counterbore 22 with its inner face bearing against the end face of the adjacent trunnion, thereby providing an end thrust bearing for the latter. These disks will be permanently secured in position by pressing stock from the transmission member sections over the outer end of the respective disks. To faciliate this operation and secure greater strength, the outer end of each end thrust disk is chamfered, and the metal stock of the transmission sections is pressed as by a rolling operation, over the chamfered edges, as shown in the drawing. However, my invention contemplates retaining the end thrust bearing member in position by stock from any member fixed with respect to the trunnion bearing or the connecting ring, both of which are integral in the present construction. In this way, the bearing disks will be rigidly and permanently secured in position and an effective end thrust bearing is provided for each trunnion. Furthermore, this construction enables compactness of parts and promotes efficiency, especially because maximum bearing for the trunnions is provided, the radial dimension of the trunnion figured in proportion to the load does not impose a connecting ring and lubricant reservoir of unusually large diameter, and at the same time the lubricant reservoir may be of comparatively large capacity.

In order to insure proper contact between each bearing plate 27 and its trunnion, I prefer to interpose a compressible metallic seat between such plate and the transmission member. To this end, I position on the shoulder 23 at the base of each counterbore, a ring 28 of compressible metal, such as copper, thus providing a compressible seat for the end thrust disk. It follows that by rolling, swaging or otherwise pressing or forming a retaining wall or flange over the outer end of each disk, the latter will, by reason of the limited compressibility of said seat member, be brought with precision into contact with the outer end of its respective trunnion, thereby providing a properly fitting end thrust bearing therefor and allowing a certain degree of tolerance in dimensions in manufacture of the parts without sacrificing the desired precision and accuracy in co-operation of the parts when assembled.

It will be observed that lubricant in the reservoir or containers between the trunnions will work through passages 29, (which register with the ends of the slots 14) to the end thrust bearing and to the bearings 18, thus effectively lubricating the trunnions. By taking the end thrust at the outer ends of the trunnions, the inner ends thereof may be effectually packed and sealed against the loss of lubricant by means of the packings 19 described above.

It is believed that the foregoing conveys a clear understanding of the objects prefaced above, and while I have illustrated but a single working embodiment, it should be understood that considerable change might be made in details of construction without departing from the spirit and scope of the invention as expressed in the appended claims, in which—

I claim:

1. A universal joint comprising in combination with trunnion coupling members of a sectional transmission body providing a lubricant container and bearings for the trunnions, means securing said sections together, and a disk member providing an end thrust bearing for the outer end of each trunnion and being retained in position by stock from the sectional body pressed over the outer marginal portion of said disk.

2. A universal joint of the character described comprising in combination with a pair of trunnion coupling members, of a transmission body bored radially to provide bearings for said trunnions and counterbored at the outer end of each bearing, and a bearing member in each counter-bore seated on the shoulder at the inner end thereof providing an end thrust bearing for the outer end of its respective trunnion, said bearing members being retained in position by metal from the transmission body constricted about the outer end of the respective bearing members.

3. A universal joint comprising trunnion coupling members, a transmission body formed of half sections shaped to jointly provide a lubricant container and bearing openings for the trunnions, said sections being finished on their meeting surfaces to provide a tight joint and finished at the inner end of each bearing opening to provide a packing seat, means for securing said sections together with the trunnions assembled therebetween, a packing between the inner end of each trunnion and its respective packing seat, and a bearing disk providing an end thrust bearing for the outer end of each trunnion and secured in position by said sections.

4. A universal joint comprising in combination with trunnion coupling members, of a sectional transmission body comprising two half sections shaped to jointly provide a lubricant container and radial openings for trunnion bearings, said sections being finished at the inner ends of said bearings to provide packing seats, and said bearing openings being counter-bored at their outer ends, means for securing said sections together with the trunnions assembled therebetween, a packing on the inner end of each trunnion seated against its respective packing seat on said sections, a bearing member secured in each counter-bore and providing end thrust bearing for its respective trunnion, and means providing lubricant communication between the lubricant container and the trunnion bearings.

5. In a universal joint, the combination with trunnion coupling members, of a transmission body bored radially to provide bearings for the trunnions and counter-bored at the outer end of each trunnion bearing for the reception of an end thrust bearing member, a compressible seat in each counter-bore, and a bearing member secured in each counter-bore against said seat and providing an end thrust bearing for its respective trunnion.

6. A universal joint comprising trunnion coupling members, a transmission body providing a lubricant container and radial bearings for the reception of said trunnions, a packing between the inner end of each trunnion and the transmission body, and a split retaining ring around each packing with the ends of the ring overlapping whereby to compressingly but yieldingly retain the packing.

7. A universal joint comprising trunnion coupling members, a transmission body providing a lubricant container and having bearings for said trunnions, an end thrust bearing on the transmission member for the outer end of each trunnion, said outer end of each trunnion being diametrically slotted, and means providing communication between the ends of said slots and said container for the passage of lubricant.

CARL E. SWENSON.